UNITED STATES PATENT OFFICE.

GEORGE W. L. MARSDEN, OF WILMINGTON, DELAWARE, ASSIGNOR TO HIMSELF, AND EDGAR H. ANDRESS, OF NEWARK, NEW JERSEY.

MIXED PAINT.

SPECIFICATION forming part of Letters Patent No. 341,760, dated May 11, 1886.

Application filed August 31, 1885. Serial No. 175,806. (Specimens.)

*To all whom it may concern:*

Be it known that I, GEORGE W. L. MARSDEN, of Wilmington, in the county of New Castle and State of Delaware, have invented a new and Improved Composition for Water-Proof Paint, of which the following is a full, clear, and exact description.

My composition consists of the following ingredients, combined substantially in the proportions stated: red or white lead, sixty (60) per cent.; pulverized mineral fiber, twenty-four (24) per cent.; hydraulic cement, ten (10) per cent.; pulverized rosin, six (6) per cent.

The ingredients above named are to be thoroughly mixed, and reduced to a proper consistence for application by adding a liquid, preferably consisting of twenty-five per cent. each of turpentine and linseed-oil and fifty per cent. of marine varnish.

The term "mineral fiber," as employed in the above formula, is generic, and covers all such substances as mineral wool, slag-wool, rock-wool, silicate-cotton, ground glass, &c.

By the use of such a composition as I have described I obtain a paint that is highly impervious to the action of water and the atmosphere, and consequently a paint that is well adapted for use on ships' bottoms, the action of the water being to change the paint into a hard, stone-like substance, thus preventing the fouling of the bottoms, and, in the case of iron ships or vessels, the rusting of the iron.

Having thus described my invention, what I claim as new, and desire to secure by Letters Patent, is—

The herein-described composition of matter, consisting of red or white lead, mineral fiber, hydraulic cement, and rosin, in about the proportions specified.

GEORGE W. L. MARSDEN.

Witnesses:
A. M. KING,
H. BORGMAN.